(12) United States Patent
Phillips et al.

(10) Patent No.: US 7,695,394 B2
(45) Date of Patent: Apr. 13, 2010

(54) MULTI-SPEED TRANSMISSION

(75) Inventors: Andrew W. Phillips, Saline, MI (US);
Scott H. Wittkopp, Ypsilanti, MI (US);
James M. Hart, Belleville, MI (US);
Clinton E. Carey, Monroe, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 381 days.

(21) Appl. No.: 11/829,141

(22) Filed: Jul. 27, 2007

(65) Prior Publication Data

US 2008/0182706 A1 Jul. 31, 2008

Related U.S. Application Data

(60) Provisional application No. 60/898,961, filed on Jan. 31, 2007.

(51) Int. Cl.
*F16H 3/62* (2006.01)
*F16H 3/44* (2006.01)

(52) U.S. Cl. .................. 475/275; 475/280; 475/282; 475/286; 475/290; 475/317

(58) Field of Classification Search ......... 475/275–280, 475/282, 284, 286, 288, 290, 293, 296, 303, 475/311, 313, 317, 319, 323, 325
See application file for complete search history.

(56) References Cited

U.S. PATENT DOCUMENTS

| | | | |
|---|---|---|---|
| 5,133,697 A * | 7/1992 | Hattori | 475/276 |
| 6,176,803 B1 | 1/2001 | Meyer et al. | |
| 6,558,287 B2 | 5/2003 | Hayabuchi et al. | |
| 6,743,140 B1 * | 6/2004 | Lee et al. | 475/275 |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,101,305 B2 | 9/2006 | Tabata et al. | |
| 7,163,484 B2 | 1/2007 | Klemen | |
| 7,285,069 B2 * | 10/2007 | Klemen | 475/275 |
| 7,311,635 B2 * | 12/2007 | Klemen | 475/286 |
| 2004/0048716 A1 * | 3/2004 | Ziemer | 475/286 |
| 2005/0090362 A1 | 4/2005 | Abe et al. | |
| 2006/0270513 A1 | 11/2006 | Klemen | |
| 2006/0270516 A1 | 11/2006 | Klemen | |

FOREIGN PATENT DOCUMENTS

CN 1776253 A 5/2006
DE 102004040904 A1 3/2006

* cited by examiner

*Primary Examiner*—Tisha D Lewis

(57) ABSTRACT

A transmission is provided having an input member, an output member, four planetary gear sets, a plurality of coupling members and a plurality of torque transmitting devices. Each of the planetary gear sets includes first, second and third members. The torque transmitting devices may include clutches and brakes.

12 Claims, 2 Drawing Sheets

| GEAR STATE | GEAR RATIO | RATIO STEP | TORQUE TRANSMITTING ELEMENTS ||||| 
|---|---|---|---|---|---|---|---|
| | | | 88 | 86 | 80 | 84 | 82 |
| Rev | -3.609 | | X | | | | X |
| N | | -0.78 | O | | | | |
| 1st | 4.600 | | X | | | X | |
| 2nd | 3.116 | 1.48 | X | X | | | |
| 3rd | 2.395 | 1.30 | X | | X | | |
| 4th | 1.718 | 1.39 | | X | X | | |
| 5th | 1.319 | 1.30 | | | X | X | |
| 6th | 1.098 | 1.20 | | | X | | X |
| 7th | 0.853 | 1.29 | | | | X | X |
| 8th | 0.677 | 1.26 | | X | | | X |

X = Engaged, Carrying Torque

O = Engaged, Not Carrying Torque

FIG. 3

MULTI-SPEED TRANSMISSION

CROSS-REFERENCE TO RELATED APPLICATIONS

This application claims the benefit of U.S. Provisional Application No. 60/898,961 filed on Jan. 31, 2007. The disclosure of the above application is incorporated herein by reference.

FIELD

The invention relates generally to a multiple speed transmission having a plurality of planetary gear sets and a plurality of torque transmitting devices and more particularly to a transmission having eight or more speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. Each of the planetary gear sets includes first, second and third members. The torque transmitting devices are for example clutches and brakes.

An embodiment of the transmission includes four planetary gear sets, four clutches, and one brake.

It is thus an object of the present invention to provide a transmission having four planetary gear sets.

It is a further object of the present invention to provide a transmission having at least eight forward speeds and at least one reverse.

It is a still further object of the present invention to provide a transmission having four planetary gear sets, a plurality of coupling members and a plurality of torque transmitting devices.

Further objects, aspects and advantages of the present invention will become apparent by reference to the following description and appended drawings wherein like reference numbers refer to the same component, element or feature.

BRIEF DESCRIPTION OF THE DRAWINGS

FIG. 3 is a truth table presenting the state of engagement of the various torque transmitting clutches in each of the available forward and reverse speeds or gear ratios of the transmission illustrated in FIGS. 1 and 2.

DESCRIPTION OF THE PREFERRED EMBODIMENTS

The following description is merely exemplary in nature and is not intended to limit the present disclosure, application, or uses.

At the outset, it should be appreciated that in the particular example provided, the eight speed automatic transmission of the present invention has an arrangement of permanent mechanical connections between the elements of the four planetary gear sets. A first component or element of a first planetary gear set is permanently coupled to a first component or element of a second planetary gear set. A second component or element of the first planetary gear set is permanently coupled to a stationary element. A second component or element of the second planetary gear set is permanently coupled to a second component or element of a third planetary gear set. A first component or element of the third planetary gear set is permanently coupled to a first component or element of a fourth planetary gear set. Finally, a third component or element of the third planetary gear set is permanently coupled to a third component or element of the fourth planetary gear set.

Figure 1:
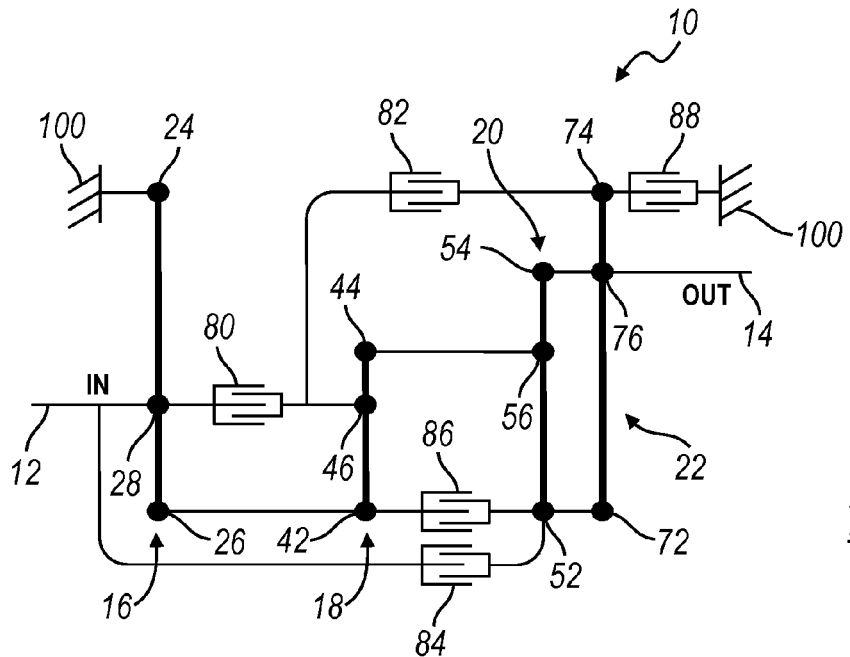
FIG. 1 is a lever diagram of an embodiment of an eight speed transmission according to the present invention.

Referring now to FIG. 1, an embodiment of an eight speed transmission 10 is illustrated in a lever diagram format. A lever diagram is a schematic representation of the components of a mechanical device such as an automatic transmission. Each individual lever represents a planetary gear set wherein the three basic mechanical components of the planetary gear set are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input member 12 and an output member 14. In the present embodiment, input member 12 and output member 14 are shafts, and will be referred to as such. Those skilled in the art will appreciate that the input and output members 12, 14 may be components other than shafts. The input member 12 is continuously connected to an engine (not shown) or to a turbine of a torque converter (not shown). The output member 14 is continuously connected with the final drive unit (not shown).

The transmission 10 further includes a first planetary gear set 16 having three nodes: a first node 24, a second node 26 and a third node 28, a second planetary gear set 18 having three nodes: a first node 42, a second node 44 and a third node 46, a third planetary gear set 20 having three nodes: a first node 52, a second node 54 and a third node 56, and a fourth planetary gear set 22 having three nodes: a first node 72, a second node 74 and a third node 76.

The input member 12 is coupled to the third node 28 of the first planetary gear set 16. The output member 14 is coupled to the third node 76 of the fourth planetary gear set 22. The first node 24 of the first planetary gear set 16 is coupled to a stationary element or transmission housing 100. The second node 26 of the first planetary gear set 16 is coupled to the first node 42 of the second planetary gear set 18. The second node 44 of the second planetary gear set 18 is coupled to the third node 56 of the third planetary gear set 20. The first node 52 of the third planetary gear set 20 is coupled to a first node 72 of the fourth planetary gear set 22. The second node 54 of the third planetary gear set 20 is coupled to the third node 76 of the fourth planetary gear set 22.

A first clutch 80 selectively connects the third node 28 of the first planetary gear set 16 with the third node 46 of the second planetary gear set 18. A second clutch 82 selectively connects the third node 46 of the second planetary gear set 18 with the second node 74 of the fourth planetary gear set 22. A third clutch 84 selectively connects the input member 12 with the first node 52 of the third planetary gear set 20. A fourth clutch 86 selectively connects the first node 42 of the second planetary gear set 18 with the first node 52 of the third planetary gear set 20. A first brake 88 selectively connects the second node 74 of the fourth planetary gear set 22 with a stationary element or the transmission housing 100.

Figure 2:
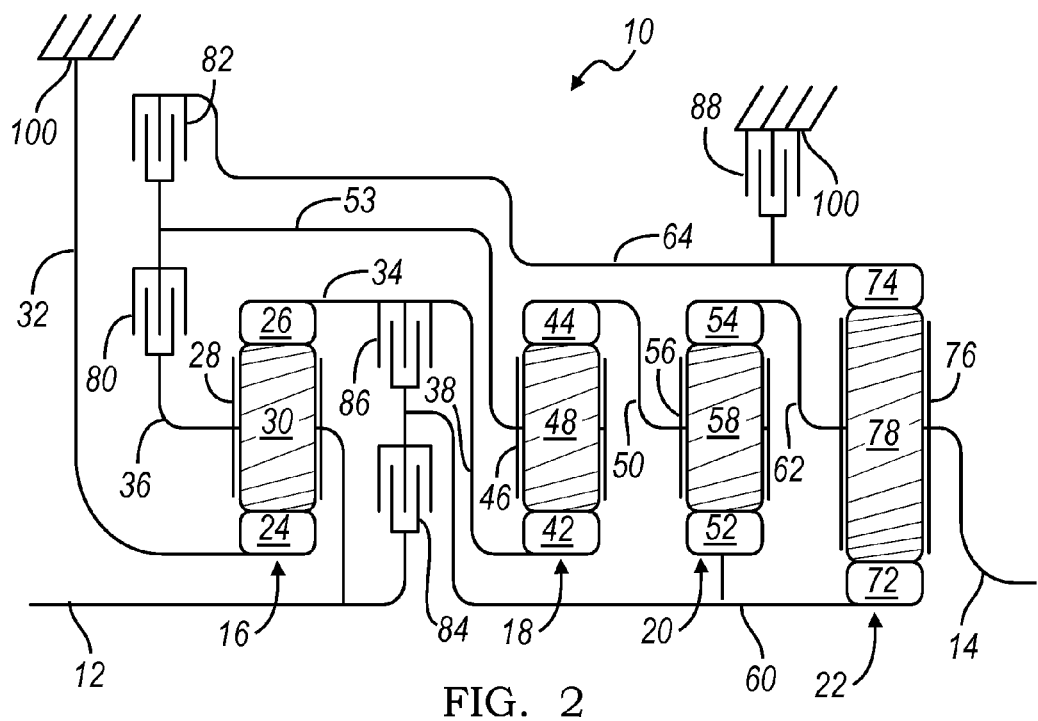
FIG. 2 is a diagrammatic view of an embodiment of an eight speed transmission according to the present invention.

Referring now to FIG. 2, a stick diagram presents a schematic layout of the embodiment of the eight speed transmission 10 according to the present invention. In FIG. 2, the numbering from the lever diagram of FIG. 1 is carried over. The clutches, brakes, and couplings are correspondingly presented whereas the nodes of the planetary gear sets now appear as components of planetary gear sets such as sun gears, ring gears, planet gears and planet gear carriers.

For example, the first planetary gear set 16 includes a sun gear member 24, a ring gear member 26 and a carrier member 28 that rotatably supports a set of pinion gears 30 (only one shown). Sun gear member 24 is connected for common rotation with a first shaft or intermediate member 32. The first intermediate member 32 is connected to the transmission housing 100 and, thus, prevents sun gear member 24 from rotating relative to the transmission housing 100. Ring gear member 26 is connected for common rotation with a second shaft or intermediate member 34. Pinion gears 30 are configured to intermesh with sun gear member 24 and ring gear member 26. Carrier member 28 is connected for common rotation with a third shaft or intermediate member 36 and the input member 12.

The second planetary gear set 18 includes a sun gear member 42, a ring gear member 44 and a carrier member 46 that rotatably supports a set of pinion gears 48. Sun gear member 42 is connected for common rotation with a fourth shaft or intermediate member 38. Ring gear member 44 is connected for common rotation with a fifth shaft or intermediate member 50. Carrier member 46 is connected for common rotation with a sixth shaft or intermediate member 53. Pinion gears 48 are configured to intermesh with both sun gear member 42 and ring gear member 44.

The third planetary gear set 20 includes a sun gear member 52, a ring gear member 54 and a carrier member 56 that rotatably supports a set of pinion gears 58. Sun gear member 52 is connected for common rotation with a seventh shaft or intermediate member 60. Ring gear member 54 is connected for common rotation with an eighth shaft or intermediate member 62. Carrier member 56 is connected for common rotation with the fifth intermediate member 50. Pinion gears 58 are configured to intermesh with both sun gear member 52 and ring gear member 54.

The fourth planetary gear set 22 includes a sun gear member 72, a ring gear member 74 and a carrier member 76 that rotatably supports a set of pinion gears 78. Sun gear member 72 is connected for common rotation with the seventh intermediate member 60. Ring gear member 74 is connected for common rotation with a ninth shaft or intermediate member 64. Carrier member 76 is connected for common rotation with the output member 14. Pinion gears 78 are configured to intermesh with both sun gear member 72 and ring gear member 74.

The torque-transmitting mechanisms or the clutches 80, 82, 84, 86 and the brake 88 allow for selective interconnection of the shafts or intermediate members, members of the planetary gear sets and the housing. For example, the first clutch 80 is selectively engageable to connect the third intermediate member 36 to the sixth intermediate member 53. The second clutch 82 is selectively engagable to connect the sixth intermediate member 53 to the ninth intermediate member 64. The third clutch 84 is selectively engagable to connect the input member 12 to the seventh intermediate member 60. The fourth clutch 86 is selectively engagable to connect the seventh intermediate member 60 to the second intermediate member 34 and to the fourth intermediate member 38. The brake 88 is selectively engagable to connect the ninth intermediate member 64 to the transmission housing 100 to restrict rotation of the ring gear member 74 relative to the transmission housing 100.

Referring now to FIGS. 2 and 3, the operation of the embodiment of the eight speed transmission 10 will be described. It will be appreciated that the transmission 10 is capable of transmitting torque from the input shaft or member 12 to the output shaft or member 14 in at least eight forward speed or torque ratios and at least one reverse speed or torque ratio. Each forward and reverse speed or torque ratio is attained by engagement of one or more of the torque-transmitting mechanisms (i.e. first clutch 80, second clutch 82, third clutch 84, fourth clutch 86, and brake 88), as will be explained below. FIG. 3 is a truth table presenting the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the brake 88 and the second clutch 82 are engaged or activated. The brake 88 connects the ninth intermediate member 64 with the transmission housing 100. The second clutch 82 connects the ninth intermediate member 64 to the sixth intermediate member 53. Likewise, the eight forward ratios are achieved through different combinations of clutch and brake engagement, as shown in FIG. 3.

It will be appreciated that the foregoing explanation of operation and gear states of the eight speed transmission 10 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission comprising:
   an input member;
   an output member;
   first, second, third and fourth planetary gear sets each having first, second and third members;
   a first interconnecting member continuously interconnecting the first member of the first planetary gear set with a stationary element;
   a second interconnecting member continuously interconnecting the third member of the first planetary gear set with the first member of the second planetary gear set;
   a third interconnecting member continuously interconnecting the third member of the second planetary gear set with the second member of the third planetary gear set;
   a fourth interconnecting member continuously interconnecting the first member of the third planetary gear set with the first member of the fourth planetary gear set;
   a fifth interconnecting member continuously interconnecting the third member of the third planetary gear set with the second member of the fourth planetary gear set; and
   five torque-transmitting mechanisms selectively engageable to interconnect one of the first, second, and third members with another of the first, second, and third members and the stationary element; and
   wherein the torque-transmitting mechanisms are selectively engageable in combinations of at least two to establish at least eight forward speed ratios and at least one reverse speed ratio between the input member and the output member;
   wherein a first of the five torque transmitting mechanisms is selectively engageable to interconnect the second member of the second planetary gear set with the third member of the fourth planetary gear set.

2. The transmission of claim 1 wherein a second of the five torque transmitting mechanisms is selectively engageable to interconnect the second member of the first planetary gear set with the second member of the second planetary gear set.

3. The transmission of claim 2 wherein a third of the five torque transmitting mechanisms is selectively engageable to interconnect the input member and the second member with the first member of the third planetary gear set and the first member of the fourth planetary gear set.

4. The transmission of claim 3 wherein a fourth of the five torque transmitting mechanisms is selectively engageable to interconnect the third member of the first planetary gear set and the first member of the second planetary gear set with the first member of the third planetary gear set and the first member of the fourth planetary gear set.

5. The transmission of claim 4 wherein a fifth of the five torque transmitting mechanisms is selectively engageable to interconnect the third member of the fourth planetary gear set with the stationary element.

6. The transmission of claim 1 wherein the input member is continuously interconnected with the second member of the first planetary gear set and the output member is continuously interconnected with the second member of the fourth planetary gear set.

7. The transmission of claim 1 wherein the first, second, third, and fourth, torque transmitting mechanisms are clutches and the fifth torque transmitting mechanism is a brake.

8. The transmission of claim 1 wherein the first members are sun gears, the second members are planet carrier members, and the third members are ring gears.

9. A transmission comprising:
   an input member;
   an output member;
   first, second, third and fourth planetary gear sets each having first, second and third members, and wherein the input member is continuously interconnected with the second member of the first planetary gear set and the output member is continuously interconnected with the second member of the fourth planetary gear set;
   a first interconnecting member continuously interconnecting the first member of the first planetary gear set with a stationary element;
   a second interconnecting member continuously interconnecting the third member of the first planetary gear set with the first member of the second planetary gear set;
   a third interconnecting member continuously interconnecting the third member of the second planetary gear set with the second member of the third planetary gear set;
   a fourth interconnecting member continuously interconnecting the first member of the third planetary gear set with the first member of the fourth planetary gear set;
   a fifth interconnecting member continuously interconnecting the third member of the third planetary gear set with the second member of the fourth planetary gear set;
   a first torque transmitting mechanism selectively engageable to interconnect the second member of the first planetary gear set with the second member of the second planetary gear set;
   a second torque transmitting mechanism selectively engageable to interconnect the second member of the second planetary gear set with the third member of the fourth planetary gear set;
   a third torque transmitting mechanism selectively engageable to interconnect the input member and the second member with the first member of the third planetary gear set and the first member of the fourth planetary gear set;
   a fourth torque transmitting mechanism selectively engageable to interconnect the third member of the first planetary gear set and the first member of the second planetary gear set with the first member of the third planetary gear set and the first member of the fourth planetary gear set; and
   a fifth torque transmitting mechanism selectively engageable to interconnect the third member of the fourth planetary gear set with the stationary element; and
   wherein the torque-transmitting mechanisms are selectively engageable in combinations of at least two to establish at least eight forward speed ratios and at least one reverse speed ratio between the input member and the output member.

10. The transmission of claim 9 wherein the first, second, third, and fourth torque transmitting mechanisms are clutches and the fifth torque transmitting mechanism is a brake.

11. The transmission of claim 9 wherein the first members are sun gears, the second members are carrier members, and the third members are ring gears.

12. A transmission comprising:
    an input member;
    an output member;

first, second, third and fourth planetary gear sets each having a sun gear, a carrier member, and a ring gear, and wherein the input member is continuously interconnected with the carrier member of the first planetary gear set and the output member is continuously interconnected with the carrier member of the fourth planetary gear set;

a first interconnecting member continuously interconnecting the sun gear of the first planetary gear set with a stationary element;

a second interconnecting member continuously interconnecting the ring gear of the first planetary gear set with the sun gear of the second planetary gear set;

a third interconnecting member continuously interconnecting the ring gear of the second planetary gear set with the carrier member of the third planetary gear set;

a fourth interconnecting member continuously interconnecting the sun gear of the third planetary gear set with the sun gear of the fourth planetary gear set;

a fifth interconnecting member continuously interconnecting the ring gear of the third planetary gear set with the carrier member of the fourth planetary gear set;

a first torque transmitting mechanism selectively engageable to interconnect the carrier member of the first planetary gear set with the carrier member of the second planetary gear set;

a second torque transmitting mechanism selectively engageable to interconnect the carrier member of the second planetary gear set with the ring gear of the fourth planetary gear set;

a third torque transmitting mechanism selectively engageable to interconnect the input member and the carrier member with the sun gear of the third planetary gear set and the sun gear of the fourth planetary gear set;

a fourth torque transmitting mechanism selectively engageable to interconnect the ring gear of the first planetary gear set and the sun gear of the second planetary gear set with the sun gear of the third planetary gear set and the sun gear of the fourth planetary gear set; and a fifth torque transmitting mechanism selectively engageable to interconnect the ring gear of the fourth planetary gear set with the stationary element; and wherein the torque-transmitting mechanisms are selectively engageable in combinations of at least two to establish at least eight forward speed ratios and at least one reverse speed ratio between the input member and the output member.

* * * * *